United States Patent [19]
Miller et al.

[11] Patent Number: 5,892,612
[45] Date of Patent: Apr. 6, 1999

[54] TUNABLE OPTICAL FILTER WITH WHITE STATE

[75] Inventors: Peter Miller, Somerville; Carl Buhrer, Framingham, both of Mass.

[73] Assignee: Cambridge Research & Instrumentation Inc., Cambridge, Mass.

[21] Appl. No.: 908,355

[22] Filed: Aug. 7, 1997

[51] Int. Cl.$^6$ .............................. G02F 1/03; G02F 1/29
[52] U.S. Cl. ................... 359/250; 359/245; 359/252; 359/256; 359/320
[58] Field of Search .................... 359/250–256, 359/320, 245, 246

[56] References Cited

U.S. PATENT DOCUMENTS

| | | |
|---|---|---|
| 4,197,008 | 4/1980 | Pinnow et al. . |
| 4,582,396 | 4/1986 | Bos et al. . |
| 5,247,378 | 9/1993 | Miller . |
| 5,528,393 | 6/1996 | Sharp et al. . |

OTHER PUBLICATIONS

"Optical Network Synthesis Using Birefrigerent Crystals. I. Synthesis of Lossless Networks of Equal–Length Crystals", 54 J. Opt. Soc. Am. 1267(1964), by S.E. Harris, E.O. Amman, I.C. Chang.

"Optical Network Synthesis Using Birefrigerent Crystals. III. Some General Properties of Lossless Birefrigerent Networks", 56 J. Opt. Soc. Am. 943(1966), by E.O. Amman.

"Optical Network Synthesis Using Birefrigerent Crystals. IV. Synthesis of Lossless Double–Pass Networks", 56 J. Opt. Soc. Am. (7), 952(1966), by E.O. Amman.

"Synthesis of Optical Birefrigerent Networks", Progress in Optics IX 1971, pp. 123–177 (North–Holland, Amerstand) by E.O. Amman.

"Flat Passband Birefrigerent Wavelength Domain Multiplexer", 25 Electronics Letters 106–7 (1987), by W.J. Carlssen and C.F. Buhrer.

"A New RGB Tunable Filter Technology" 2650 Proc. of S.P.I.E., 98 (1996), by Sharp and Johnson.

"Synthesis and Tuning of High–Order Solc–Type Birefrigerent Filters", 33 Applied Optics 2249–54 (1994).

"The Birefrigerent Filter", 39 J. Opt. Soc. Am. 229–42 (1949).

"Achromatic Combinations of Half–Wave Plates", 49 J. Opp. Soc. Am. 405–409 (1959).

*Primary Examiner*—Georgia Epps
*Assistant Examiner*—Suzanne Letendre
*Attorney, Agent, or Firm*—Cohen, Pontani, Lieberman & Pavane

[57] ABSTRACT

A switchable optical birefringent filter for polarized light incident thereon includes first and second retarder networks in optical series and a switch associated with at least one of the first and second retarder networks for selectively altering one of the polarization state and the angular orientation of the polarization state relative to the angular orientation of the second network, of light as it is received by the second network. In one operating mode, the filter produces a spectral filtration of light passing through the filter and in another mode transmits all light within a specified range of wavelengths without significant alteration.

20 Claims, 9 Drawing Sheets

TUNABLE OPTICAL FILTER WITH WHITE STATE

FIELD OF THE INVENTION

The present invention relates to optical filters, more particularly to optical filters constructed using birefringent materials, and most particularly to a tunable optical filter which permits selection of the passband by means of mechanical rotation or an optical switch such as an optical retarder or polarization rotator.

BACKGROUND OF THE INVENTION

Techniques for synthesis of birefringent filters have been extensively described in the literature, as for example in "Optical Network Synthesis Using Birefringent Crystals. I. Synthesis of Lossless Networks of Equal-Length Crystals", 54 *J. Opt. Soc. Am.* 1267 (1964), by S. E. Harris, E. O. Amman, I. C. Chang; "Optical Network Synthesis Using Birefringent Crystals. III. Some General Properties of Lossless Birefringent Networks", 56 *J. Opt. Soc. Am.* 943 (1966), by E. O. Amman; "Optical Network Synthesis Using Birefringent Crystals. IV. Synthesis of Lossless Double-Pass Networks", 56 *J. Opt. Soc. Am.* (7), 952 (1966), by E. O. Amman; and "Synthesis of Optical Birefringent Networks", *Progress in Optics* IX 1971, pp. 123–177 (North-Holland, Amsterdam) by E. O. Amman. The birefringent filters disclosed in the literature consist of N optical retarders placed in series and positioned between an entrance polarizer and an exit polarizer, with each element oriented at a specific angle. Taking the transmission axis of the entrance polarizer as 0°, each retarder element i has its fast axis at an angle $\phi_i$, and the exit polarizer is oriented at angle $\phi_p$. The optical retardance may be different for each element, and together the retardances form a set $R_i$ with N members.

The prior art describes methods, based on time impulse-response analysis, for determining the values $\phi_i$ and $R_i$ so that the resultant filter has a desired response. The resulting filter response is an N-point harmonic function, where the harmonic coefficients are selected to achieve some particular optical response. Often, coefficients are chosen to yield a best approximation to some desired function, and are selected by, e.g., equating the harmonic coefficients to the terms in a Fourier expansion of the desired function, or by some similar method.

The synthesis procedure utilizes a set of harmonic coefficients $C_i$ and provides one or more sets of angles $\phi_i$ that will achieve the desired filter response. In general, the solutions are not unique, and there can be several equivalent sets of angles $\phi_i$ which yield the desired filter action. When this occurs, it is possible to construct a filter in one of several ways, depending on which solution set of angles $\phi_i$ is chosen. This procedure thus provides a powerful synthesis technique for developing optical filters with a wide variety of bandpass and filtration shapes.

Although in this analytical procedure each of the retarders is considered as having the same retardance R, this does not lead to a loss in generality. For example, one may construct a retarder of value 4R by placing four retarders of value R in series. A set of retarders with arbitrary rational retardance values may thus be built up from a number of equal-value retarders. The selection of equal-value retarders in the analytical procedure is essentially one of notation, rather than one of practical limitation.

Others have employed the birefringent filter synthesis method to design filters with equal passband and stopband widths for use in optical multiplexers; see, e.g., "Flat Passband Birefringent Wavelength Domain Multiplexer", 23 *Electronics Letters* 106–7 (1987), by W. J. Carlsen and C. F. Buhrer. This synthesis procedure permits independent choice of passband and stopband ripple by selection of the harmonic coefficients, which in turn determine the angles $\phi_i$. Edge sharpness is a function of the number of retarder elements, with more retarder elements yielding greater sharpness.

U.S. Pat. No. 4,239,349 to Scheffer describes the use of birefringent films in conjunction with twisted-nematic cells and a neutral linear polarizer to achieve color switching. A birefringent filter may be used together with an optical polarization switch, such as a twisted-nematic liquid crystal cell, to create a switchable filter which can select between a certain filter state and its complement. Such a filter is shown by way of example in FIG. 1. The switch element is placed immediately adjacent to the entrance or exit polarizer, and effectively rotates it by 90° or, in its alternate state, not at all. Hence the two filter states are a color and its complement. Similar results may be achieved with liquid crystal half-wave plates or ferroelectric liquid crystal cells. The switch member may also incorporate retarder elements to achieve its switching action, as is described in "A New RGB Tunable Filter Technology" 2650 *Proc. of S.P.I.E.*, 98 (1996), by Sharp and Johnson. However, the essential function of such retarders is to selectively rotate the plane of polarization as part of the switch, rather than to define a passband as part of the birefringent filter.

On the other hand, one may also rotate individual retarder elements to change the orientation angles $\phi_i$ and thereby alter the filter response. However, such a system would be expensive and mechanically intricate.

Buhrer has described how mechanically rotating elements may be used to tune a multiplexer to all its possible settings ("Synthesis and Tuning of High-Order Solc-Type Birefringent Filters", 33 *Applied Optics* 2249–54 (1994)). Electro-optical methods have been explored in U.S. Pat. No. 4,157,008 to Pinnow et al. using a stack of doped crystals. A similar approach is possible using a series of planar-aligned smectic A* liquid crystal cells, which exhibit fixed retardance with a voltage-adjustable crystal orientation. Neither approach, however, has been widely used to date because of the limited crystal orientation ranges available.

Amman described a method for synthesizing filters that may be used in a double-pass mode. These filters include a mirror disposed at one end of a series of N retarder elements so that light passes through the retarders twice: once on its way in toward the mirror, and the second time on its way out after reflection. This arrangement is optically equivalent to a stack of 2N retarders with their fast axes oriented at angles $\{\phi_1, \phi_2, \ldots \phi_{N-1}, \phi_N, \phi_N, \phi_{N-1}, \ldots \phi_2, \phi_1\}$.

In some designs, polarization couplers are used so that light is admitted into, and extracted from, the retarder stack without interference between the two beams. Although not all filters can be constructed in this way since the harmonic coefficients of the filter response must meet certain criteria to realize this design, it is possible in many cases to employ this double-pass scheme to achieve the resolution of a filter with 2N retarders while actually using only N such components.

Amman has written various theorems pertaining to networks of retarders, along with proofs. These are useful in understanding and designing such filters, and will be referred to below.

The use of a pair of high-order retarder elements between crossed polarizers at 0° and 90° has been described by Evans in "The Birefringent Filter", 39 *J. Opt. Soc. Am.* 229–42 (1949). These elements have their axes crossed, at ±45° and −45°. A retarder with its axis at 0° (or 90°) is placed between the elements; this middle retarder can be a simple λ/2 plate, or it may be a retarder which contributes to defining a passband constructed as an (N+½)λ order waveplate. The positioning of the intermediate retarder between the outer two members dispenses with the need for a separate polarizer associated with the intermediate element thus reducing the number of polarizers and increasing the filter transmission relative to the usual Lyot design. The former arrangement is termed a wide-field filter, and the latter a split-element filter. Evans also considered adding further retarders about the split-element stage to create a doubly-split stage. In all cases, the retarders have their fast axes oriented at an angle of 0°, +/−45°, or 90° relative to the entrance polarizer.

Tunable versions of the wide-field filters are taught in U.S. Pat. No. 5,247,378 to Miller, with continuously variable nematic liquid crystal retarders as the tuning element.

U.S. Pat. No. 5,528,393 to Sharp and Johnson describes both wide-field and split-element filters which use ferroelectric smectic C* or smectic A* switches to obtain a discretely or continuously tunable bandpass, respectively. These switches have a fixed retardance and an electrically switchable crystal orientation. Sharp and Johnson also describe a reflection-mode split element filter where a mirror is placed after the central element so that light traverses the elements in both directions. This system is said to allow the same function to be achieved using a reduced number of components.

At present, however, no birefringent filter allows for selection between a white-state in which all wavelengths are transmitted and a desired complex filtration state. Nor is there a practical birefringent filter which offers non-mechanical switching between several complex transmission states, other than between a filter response and its complement.

SUMMARY OF THE INVENTION

The present invention is directed to a method and device which provide an improved birefringent filter. The inventive filter may be switched mechanically or electro-optically, without separate adjustment or switching of individual elements within the filter. Further, one of the filter states is a white-state (i.e. all-pass filter) which is particularly advantageous in numerous applications including, by way of example, digital imaging systems for photography.

Throughout this application, the terms 'fast axis' and 'slow axis' will be used to denote the respective axes of birefringent elements such as retarders and waveplates; the term 'optical axis' is used to describe the angle of incidence of the central ray passing through an individual optical element or through an overall system such as a filter.

The tunable filter of the invention has at least two optical retarder networks. The first optical retarder network has an optical axis and a first action on the polarization state of incident light passing through the first network. The second optical retarder network is disposed in optical series with the first optical retarder network and receives the light that has passed through the first network. The second optical retarder network has an optical axis and a second action on the polarization state of the received light which passes thlough the second network. The two symmetrically related retarder networks are linked by a single mechanical or optical switch element for varying the response to the light passing through the first and second networks. In one switch state the second network can be made to exactly cancel the optical action of the first network. In another switch state, the optical action of the first network is augmented by that of the second network. The first state is the white state—the switch action causes the networks to cancel. The other or second state produces a desired color filtration action. The color filtration state may for example take advantage of the full range of techniques developed by Harris, Amman, and other investigators to create complex spectral filtration shapes that use N-term harmonic expansions to achieve a desired response, without altering the theory of operation and without degrading the spectral purity or high transmission of the white state.

There are several symmetries which may be used to realize this design, all of which include a first network followed by a second, related network. If, for purposes of explanation, one denotes the N retarders in the first network as having retardance values $\{R_1, R_2, \ldots R_N\}$ and having the fast axes of the crystals oriented at angles $\{\phi_1, \phi_2, \ldots \phi_N\}$, then the second network must have retardance values of $\{R_N, R_{N-1}, \ldots R_2, R_1\}$. That is, the retarders have the same values, but in the reverse order. The retardance values are thus a mirror image of those in the first network, reflected about the mid-point of the overall assembly.

The angles of the second network may be $\{\phi_N, \phi_{N-1}, \ldots \phi_2, \phi_2\}$, or $\{\pi/2+\phi_N, \pi/2+\phi_{N-1}, \ldots \pi/2+\phi_2, \pi/2+\phi_1\}$, or $\{\phi_N, \phi_{N-1}, \ldots \phi_2, \phi_1\}$, or $\{\pi/2-\phi_N, \pi/2-\phi_{N-1}, \ldots \pi/2-\phi_2, \pi/2-\phi_1\}$.

A filter constructed using two networks in accordance with those rules of symmetry may be selectively switched between an optically filtering state and an all-pass (i.e. white) state by, in one embodiment of the invention, mechanically or optically rotating the second network effective optical axis relative to the first network by 90°. Such a switchable filter is of significant benefit in a variety of optical and optical imaging systems.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PREFERRED EMBODIMENTS

Figure 1:
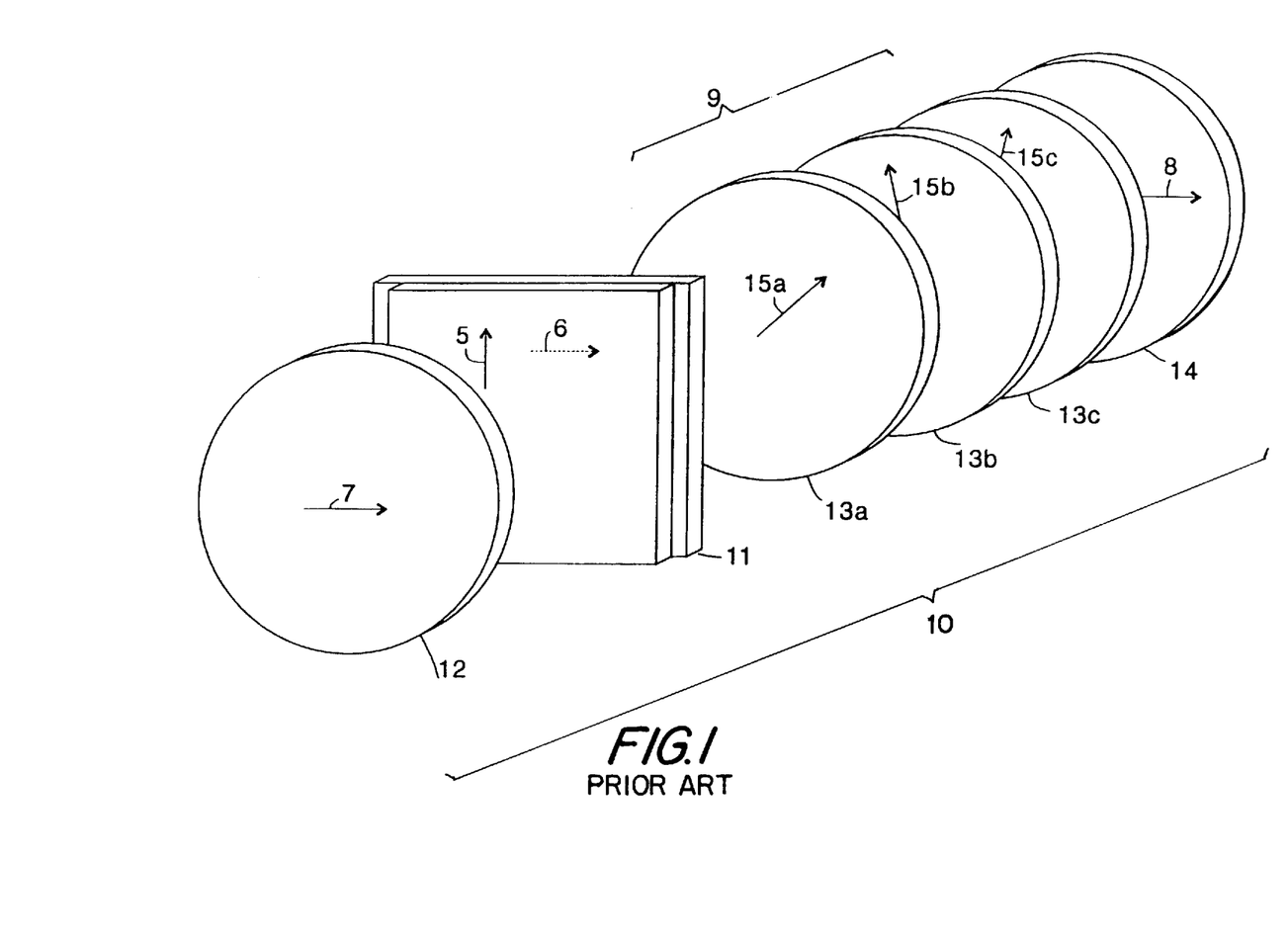
FIG. 1 shows a prior art arrangement of an optical color filter.

FIG. 1 depicts by way of example a prior-art color filter 10 formed of a liquid crystal twisted-nematic switch 11 in optical series with an entrance polarizer 12; a plurality of retardation films 13a through 13c having their fast axes oriented at angles 15a through 15c; and an exit polarizer 14. This arrangement produces a filter with a color that switches between the blue response and the complementary yellow response.

The present invention provides a selectively switchable optical filter having two filter states with different optical action, one being a white (all-pass) state, and the other having a desired spectral filtration. In the tunable optical filter of the invention, selective switching between the two states may be achieved by mechanical rotation of certain ones of the N retarder elements or, as explained below, by placing an optical switch between the two networks which form the filter, i.e. between the retarders N and N+1 in the overall assembly.

The device and method of the present invention utilize at least two filter element networks, either of which may have a complex optical response, to alternatively augment and cancel the filtering effect of one another under the control of a switch member and thus provide selection between a desired optical filtration action and a white (all-pass) state. Three classes of networks exhibit this property of selectable augmentation or cancellation in accordance with the invention.

Figures 2A, 2B:
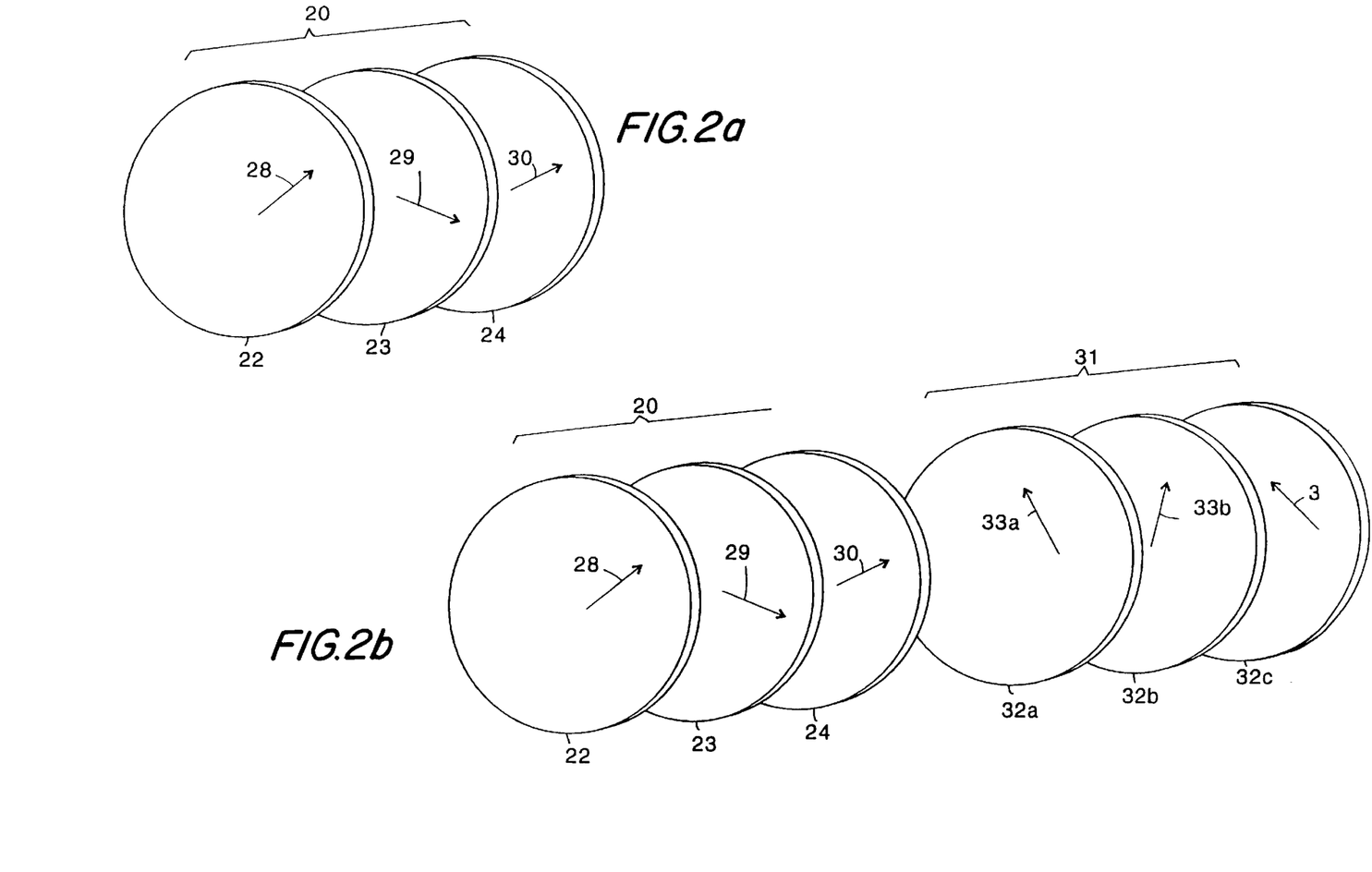
FIG. 2a and FIG. 2b each show a retardance network.

Class I:

FIG. 2a shows by way of example a retardance network 20, formed of retarders 22, 23, and 24 with respective retardance values of $\{R_1, R_2, R_3\}$ and respective fast axis orientation angles of $\{\phi_1, \phi_2, \phi_3\}$ shown as 28, 29, and 30. The network 20 will in general have N retarders with retardance values $R_1$ to $R_N$ and fast axis orientations $\phi_1$ to $\phi_N$. FIG. 2b again shows retardance network 20 but in optical series with a second retardance network 31.

Consider now a network of N retarders, having as arbitrary set $\phi$ of angles $\phi = \{\phi_1, \phi_2, \ldots \phi_n\}$ and an arbitrary set of R retardance values $R = \{R_1, R_2, \ldots R_n\}$ Such a network, with three elements, is depicted as network element 20 in FIG. 2a. If a network of this type is placed in series with a second network 31 of N retarders at angles $\phi = \{\pi/2 + \phi_n, \pi/2 + \phi_{n-1} \ldots \pi/2 + \phi_1\}$, and with retardances $R = \{R_n, R_{n-1}, \ldots R_1\}$, as illustrated in FIG. 2b, the combined or overall assembly will have no optical effect because the second network 31 exactly cancels the effect of the first network 20.

The last element (N) in the first network and the first element (1) in the second network have identical retardance but are oriented at angles which differ by $\pi/2$. Thus, taken as a pair, the net effect of these elements is to cancel one another and the pair may thus be considered inert. Theoretically, the removal of this pair from the assembly would not alter its optical properties. The same consideration is true for element N-1 in the first network and element 2 in the second network. With the innermost pair inert, and these second two thus effectively adjacent with identical retardance and orientations that differ by $\pi/2$, these second two elements will cancel one another. Thus, the central four elements are optically inert. This analytical process may be continued for all elements and, by induction it can be shown that the overall assembly has no retardance, attenuation, or optical activity of any kind. Such an assembly accordingly forms an all-pass or white-state filter when placed between parallel polarizers.

The rotation of the orientation of the second set of retarders by $\pi/2$, either mechanically or by an optical switch, results in a very different behavior of the invention. When so rotated, the optical effect of the central two retarders no longer cancels but, rather, compounds. In general, the ensemble defines a birefringent filter with 2N elements and an optical activity that may be calculated using the Jones calculus. In the following, the optical effect of the filter is derived for both cases: where the second network is rotated by $\pi/2$ relative to the first network, and where it is unrotated.

Following the notation of Amman, an optical retarder has a Jones matrix of $$N = \begin{bmatrix} e^{-ia\omega} & 0 \\ 0 & 1 \end{bmatrix} \quad (1)$$

while that of a polarizer is $$P = \begin{bmatrix} 1 & 0 \\ 0 & 0 \end{bmatrix} \quad (2)$$

The rotation matrix $S(\phi)$ is given by $$S(\phi) = \begin{bmatrix} \cos(\phi) & -\sin(\phi) \\ \sin(\phi) & \cos(\phi) \end{bmatrix} \quad (3)$$

with input and output electric fields $E_{in}$ and $E_{out}$ of $$E_{input} = \begin{bmatrix} E_x \\ E_y \end{bmatrix} e^{i\omega t}; \quad E_{output} = \begin{bmatrix} E_u \\ E_v \end{bmatrix} e^{i\omega t} \quad (4)$$

The first assembly of N retarders has an overall matrix defined by $H = S(\phi_n) \, N \, S(\phi_{n-1} - \phi_n) \, N \ldots \times S(\phi_1 - \phi_2) \, N \, S(-\phi_1)$ which may be calculated by direct matrix multiplication. As shown in the Amman paper "Optical Network Synthesis Using Birefringent Crystals. III Some General Properties of Lossless Birefringent Networks", supra., the matrix H may be rewritten as $$H = \begin{bmatrix} C(\omega) & \exp^{-iNa\omega} D(-\omega) \\ -D(\omega) & \exp^{-iNa\omega} C(-\omega) \end{bmatrix} \quad (5)$$

where $C(\phi)$ and $D(\phi)$ are polynomials in powers of $e^{-ia\omega}$ $$C(\omega) = C_0 + C_1 e^{-ia\omega} + C_2 e^{-2ia\omega} \ldots + C_n e^{-iNa\omega} \quad (6)$$

and $$D(\omega) = D_0 + D_1 e^{-ia\omega} + D_2 e^{-2ia\omega} \ldots + D_n e^{-iNa\omega} \quad (7)$$

The second network of N retarders can be produced by taking the first network and turning it end-for-end, which mirrors all angles $\phi$ into $-\phi$. Next, to get back $+\phi$, all angles $-\phi$ are explicitly replaced by $+\phi$. Finally, the network is rotated by $\pi/2$, or not rotated at all, depending on which case is to be analyzed.

The following procedure generates the Jones matrix H''( ) for such a network, in terms of the original network H( ) represented in Equation (5).

Amman showed that when a network is turned end-for-end, its Jones matrix becomes $$H'(\omega) = \begin{bmatrix} C(\omega) & D(\omega) \\ -e^{-iNa\omega}D(-\omega) & e^{-iNa\omega}C(-\omega) \end{bmatrix} \quad (8)$$

and that when the angles $\phi$ are replaced with $-\phi$, all terms in $D(\omega)$ are replaced with terms in $-D(\omega)$. Re-writing (8) accordingly, $$H''(\omega) = \begin{bmatrix} C(\omega) & -D(\omega) \\ e^{-iNa\omega}D(-\omega) & e^{-iNa\omega}C(-\omega) \end{bmatrix} \quad (9)$$

provides the matrix H''($\omega$) for the second retarder network, prior to any rotation. The action of the two networks together, with $\pi/2$ rotation, is:

$$H_{rot\pi/2} = S(\pi/2) \times H''(\omega) \times S(-\pi/2) \times H(\omega) \quad (10)$$

$$H_{rot\pi/2} = \begin{bmatrix} 0 & -1 \\ 1 & 0 \end{bmatrix} \times \begin{bmatrix} C(\omega) & -D(\omega) \\ e^{-iNa\omega}D(-\omega) & e^{-iNa\omega}C(-\omega) \end{bmatrix} \times$$

$$\begin{bmatrix} 0 & 1 \\ -1 & 0 \end{bmatrix} \times \begin{bmatrix} C(\omega) & e^{-iNa\omega}D(-\omega) \\ -D(\omega) & e^{-iNa\omega}C(-\omega) \end{bmatrix} \quad (11)$$

where the S( ) terms accommodate the rotation. Since all coefficients $C_i$ and $D_i$ are real, $$C(-\omega)=C(\omega)^* \quad (12)$$

where the asterisk ("*") indicates the complex conjugate, and similarly for D( ). Then, one may write:

$$H( )_{rot\pi/2} = \quad (13)$$

$$\begin{bmatrix} e^{-iNa\omega}[D(\omega)D(-\omega) + C(\omega)C(-\omega)] & 0 \\ 0 & e^{-iNa\omega}[C(\omega)C(-\omega) + D(\omega)D(-\omega)] \end{bmatrix}$$

$$H_{rot\pi/2} = \quad (14)$$

$$e^{-iNa\omega}\begin{bmatrix} C(\omega)^*C(\omega) + D(\omega)^*D(\omega) & 0 \\ 0 & C(\omega)^*C(\omega) + D(\omega)^*D(\omega) \end{bmatrix}$$

or, since $C^*C+D^*D=1$, $$H_{rot\pi/2} = e^{-iNa\omega}\begin{bmatrix} 1 & 0 \\ 0 & 1 \end{bmatrix} \quad (15)$$

This result defines a simple phase delay of length N·a, for all polarizations and wavelengths of light. Other than the optical path length of the elements, there is no effect at all, and all colors of light are transmitted (white state).

However, when the second network is not rotated by $\pi/2$, so that its element angles are $\phi_i=\phi_n, \phi_{n-1}, \ldots \phi_1$, the overall assembly has a Jones matrix of:

$$H_{unrotated} = H''(\omega) \times H(\omega) \quad (16)$$

$$H_{unrotated} = \begin{bmatrix} C(\omega)^2 + D(\omega^2) \\ e^{-iNa\omega}[C(\omega)D(-\omega) - C(-\omega)D(\omega)] \\ e^{-iNa\omega}[C(\omega)D(-\omega) - C(-\omega)D(\omega)] \\ e^{-2iNa\omega}[C(\omega)^2 + D(\omega)^2] \end{bmatrix} \quad (17)$$

In combination, the two networks thus form a pair having the special property that when the second network is mechanically or electro-optically rotated relative to the first network from a first orientation to a second orientation through an angle of $\pi/2$, the overall effect switches between that of Eq. 17, and no effect at all (white state). Since switching between these states is achieved by rotating all members in the second network by the same amount, i.e. $\pi/2$, this switching may be accomplished through operation of a single rotation element.

No restrictions have been placed on the angles $\phi_i$ in the first retarder network in the foregoing. Since the second network elements have the same angles as the elements of the first, but in reverse order, the choice of $\phi_i$ for the first network completely determines the angles for the second network as well. One acceptable design sequence is to determine an overall optical response, as given in Eq. 17, and then calculate the angles $\phi_i$ using the methods described in Harris, Amman, and Chang to synthesize retarder networks with a given set of polynomial coefficients in powers of $e^{-ia\omega}$.

As will be apparent, the polynomial coefficients may be selected so as to achieve a desired passband. The selected transmission is determined in accordance with the requirements at hand, and is usually chosen as a Fourier expansion to fit some desired function with minimum error. These are the same harmonic coefficients described above, and it is possible to design a wide variety of filter passbands. The same synthesis methods used for any birefringent filter may be successfully applied here. There are not 2N independent design parameters, as might be expected for a general filter with 2N retarder elements, but only N design parameters because the symmetry requirements remove the N degrees of freedom corresponding to the second or latter half of the filter.

The optical action of the filter in this switch setting is the same as that analyzed by Amman in his derivation of non-switchable double-pass birefringent filters. That is, the filter is equivalent to a series of 2N retarders with fast axes orientated at angles $\{\phi_i, \phi_2, \ldots \phi_{N-1}, \phi_N, \phi_N, \phi_{N-1}, \ldots \phi_2, \phi_1\}$, having mirror symmetry in azimuth angle about the middle member. In this context, if the harmonic coefficients $C_i$ used to specify the spectral filtration are derived from a sine (rather than cosine) Fourier expansion, the synthesis method of Harris, Amman, and Chang will in every case yield a filter design which has the required symmetry in retarder azimuth angles. This is a suitable way to devise the retarder angles necessary for producing a filter of Class I symmetry having the desired spectral filtration.

Figure 3:
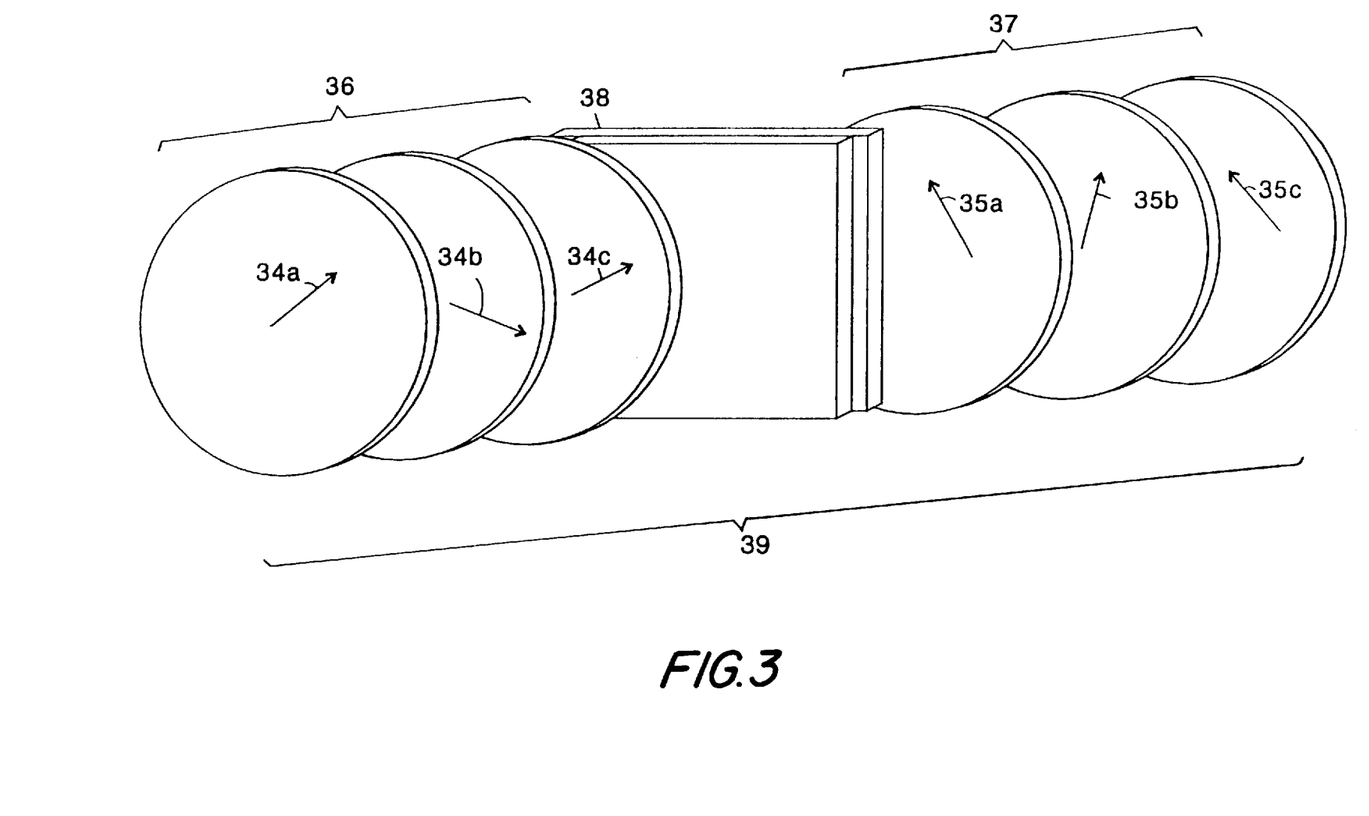
FIG. 3 shows a switchable filter of the invention using a liquid crystal switch.

FIG. 3 depicts a switchable filter 39 constructed in accordance with the present invention and comprising a series pair of retardance networks 36 and 37 with a liquid crystal switch 38 disposed between, or intermediate, the two networks.

Figure 4:
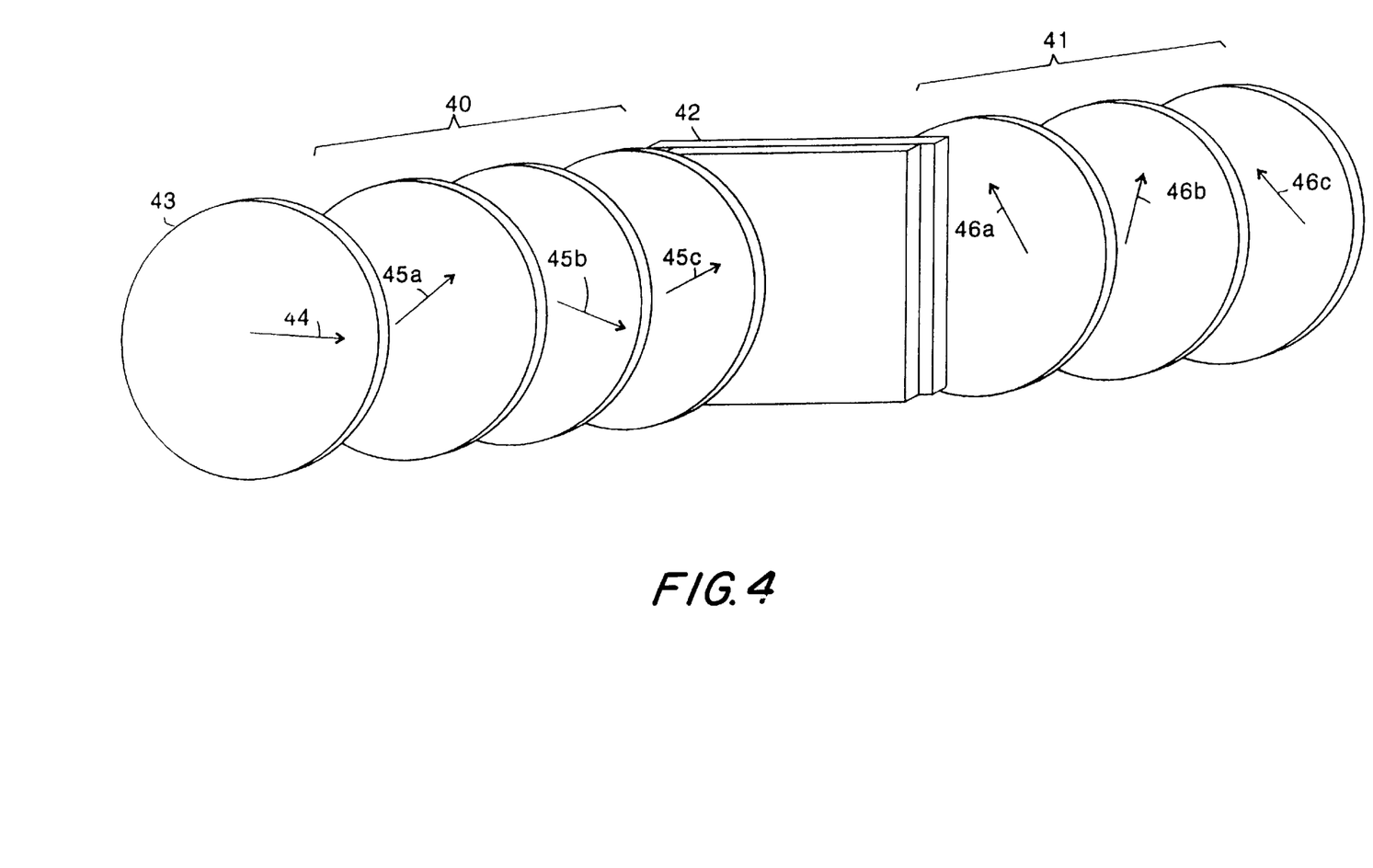
FIG. 4 shows an alternate embodiment of the inventive filter.

FIG. 4 shows a similar arrangement of series networks 40 and 41 and a liquid crystal switch 42, but further including an entrance polarizer 43 having a transmission axis orientation indicated by arrow 44.

Figure 5:
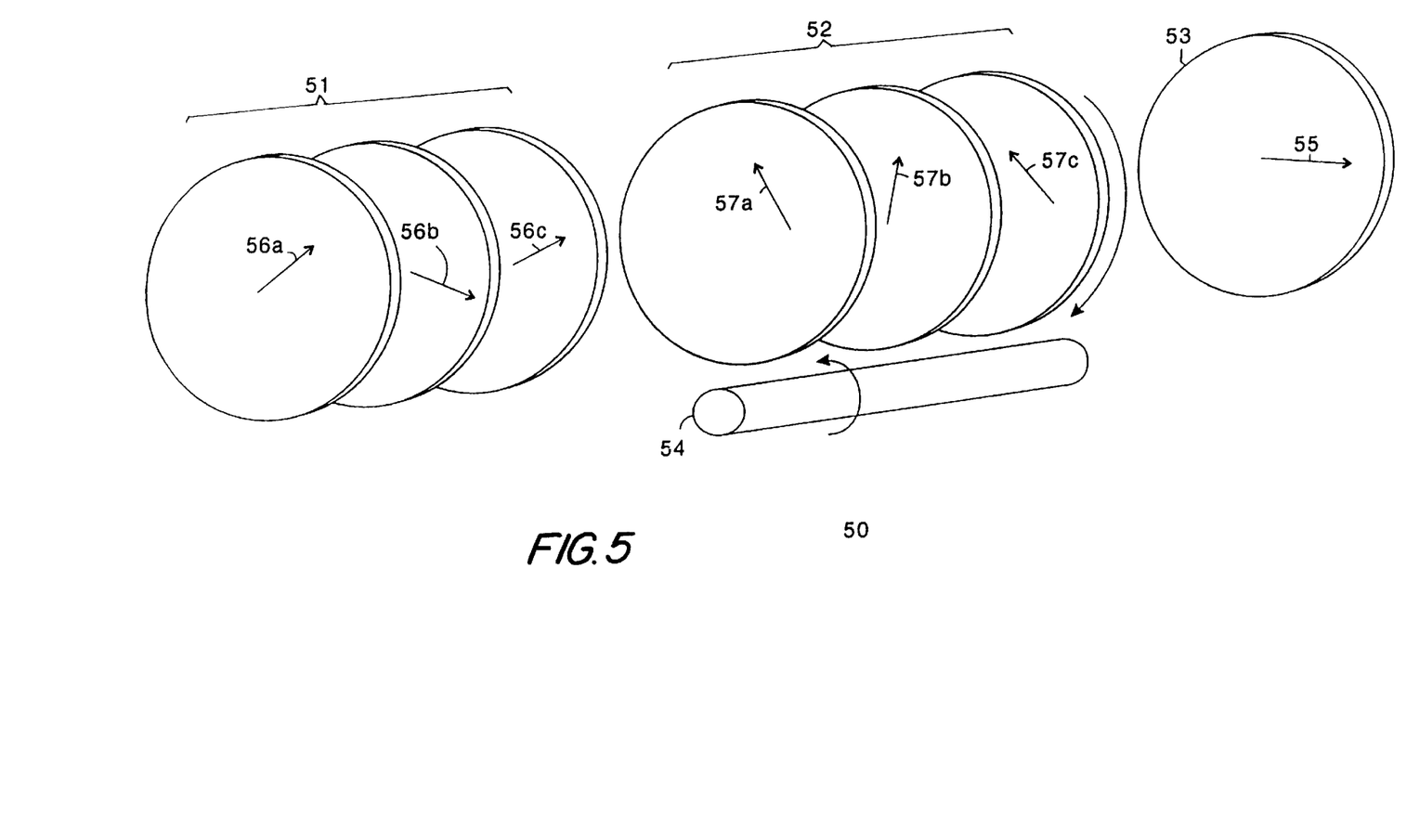
FIG. 5 shows still another embodiment of the inventive filter with a mechanical switch.

Shown in FIG. 5 is another switchable filter 50 constructed in accordance with the present invention and comprising series-disposed retardance networks 51 and 52 and an exit polarizer 53. A mechanical switching device 54 is provided for rotating network 52 by 90° relative to network 51 and about an axis which is parallel to the optical path for normally incident rays traversing the filter.

Figure 6:
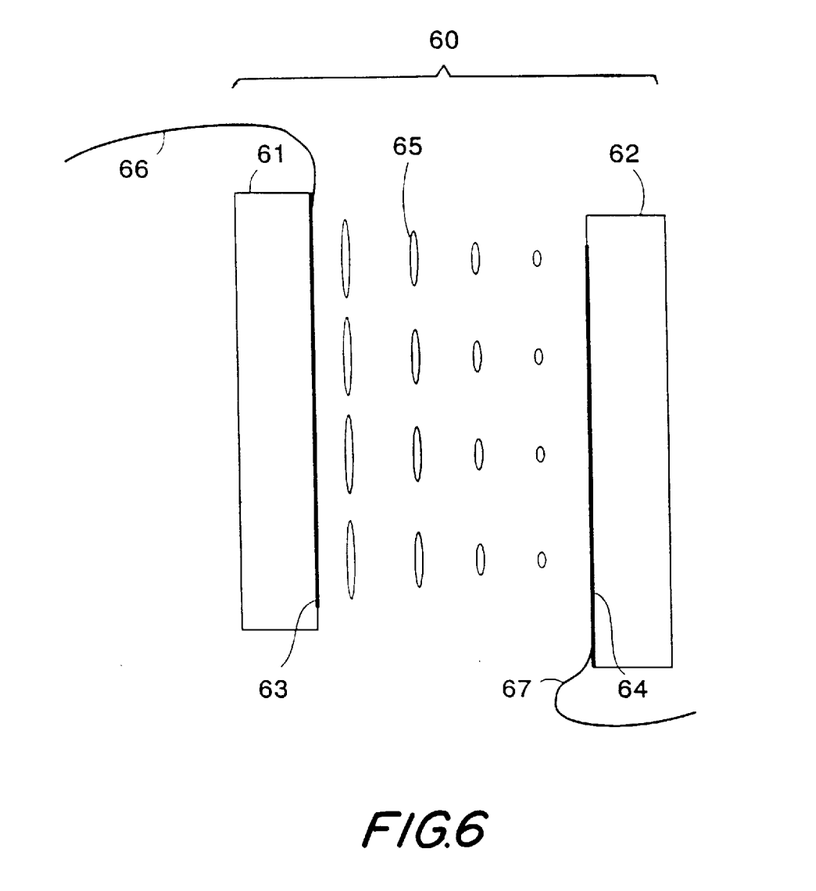
FIG. 6 is a cross-sectional side view of a liquid crystal switch for use in a filter of the invention.

FIG. 6 depicts a cross-sectional side view of a liquid crystal switch 60 suitable for use in various embodiments of the present invention. The liquid crystal switch is formed by two substrates 61 and 62 having electrodes 63 and 64 respectively on the opposed inner surfaces of these substrates. A nematic liquid crystal material 65 is-disposed in a helical orientation between the substrates. Electrical leads 66 and 67 communicate a drive signal to energize the switch.

In a preferred embodiment, the switch for the filter of the invention is an optical switch defining an optical polarization rotator capable rotating the polarization state of light by 90°. Such a device may be mechanically introduced and removed, or electro-optically switched on and off. A suitable mechanical device, for example, is a polarization rotator which is mechanically inserted into and removed from the path of the beam. One polarization rotator has been described by Koester in "Achromatic Combinations of Half-Wave Plates", J. Opt. Soc. Am. 49 (4) 405 (1959), and may be constructed with polymer retarder elements. However, Koester rotators are optical polarization rotators generally recommended only for linearly polarized incident light. When rotating arbitrary polarization states, a Koester rotator tends to introduce polarization rotation errors. A twisted-nematic cell operated near the first Gooch-Tarry minimum is an example of a suitable electro-optical switch. Such an element, commonly referred to as a "first-minimum" twisted nematic cell, rotates not only the commonly-used linear polarization state but any polarization state by 90°.

In another embodiment, the optical rotator may be a liquid crystal Koester rotator (LCKR) switch. A LCKR switch can be constructed from a pair of nematic liquid crystal $\lambda/2$ variable retarder cells oriented with crystal axes at 23° and 67°. When the cells exhibit a retardance of $\lambda/2$, they act as a 90° polarization rotator. However, when a large voltage is applied, they exhibit essentially no retardance, and there is no optical rotation. Thus, they form a selectively switchable optical rotator.

Another example of an LCKR was described by Sharp and Johnson, using an SSFLC device with $\lambda/2$ retardance and an axis which switches between +22.5° and −22.5°, followed by a fixed polymer $\lambda/2$ retarder with its axis at 67.5°. Such an arrangement is illustrated in FIG. 9.

Figure 9:
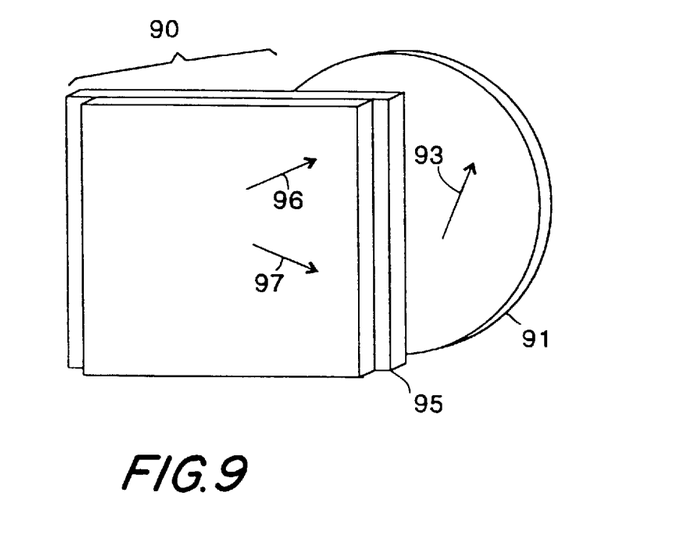
FIG. 9 shows another liquid crystal optical switch with an electrically switchable fast axis.

FIG. 9 more particularly shows an optical switch 90 formed of a fixed retarder 91 with a fast axis 93 and a liquid crystal switch 95 whose fast axis is electrically switchable between orientations 96 and 97. In the first liquid crystal axis orientation, i.e. +22.5°, the two elements act as a Koester 90° rotator. In the latter orientation of −22.5°, the SSFLC retardance cancels that of the polymer and there is no optical effect. Any optical rotor device is suitable for use in the present invention so long as it effectively rotates the polarization of all light by $\pi/2$ radians.

When an optical rotor is used to switch the filter, it effectively rotates the orientation of both the second network and the exit polarizer. Accordingly, the passband of one of the states is complementary to that described by the preceding Equations 15 and 17. If the second network is physically rotated by $\pi/2$, the switching is between the passband of Equation 17 and that of Equation 15 (white state). However, if an optical rotor switch is used with retarder networks having the retarder angles given above, the switching is between white and the complementary passband to that of Equation 17. This arrangement yields the best white-state since most real rotator elements provide their best performance in the unrotated setting. Accordingly, the filter response in Equation 17 is preferably designed to provide the complement of that which is desired; the complement's complement or the desired filter response will thus be produced by the filter.

In another embodiment, one can use another optical element, such as a switchable half-wave plate, which may be placed between the two series-disposed networks. In this alternate embodiment, the switch either presents $\lambda/2$ retardance, or essentially no retardance. In the former case, a complex passband is obtained with exact properties that will be different than those obtained where an optical rotator is used, but which may be calculated in detail using the Jones calculus. In the latter case, an excellent white state is obtained. Thus, the system desirably functions as a selectively switchable filter with one white state and one state that has a spectral filtration action which may be designed to suit the needs of the particular application.

The sense of the switching action may be inverted by constructing the second network with crystal axes angles of $$\phi = \{\phi_n, \phi_{n-1} \ldots \phi_1\},$$

in which case an optical rotator switch will select between the passband of Equation 16 and the complement of white, i.e. a dark state. Alternately, the exit polarizer may be rotated 90° to obtain a white state; the filtered state is then the complement to that in Equation 16. Using this set of crystal axes effectively reverses the switch action from a normally-filtered to a normally-white (or dark) filter type, if one adopts the convention that the switch normally acts as a rotor.

The choice of the suitable switch sense may be dictated by overall system requirements for switching, such as a requirement that the filter action be either white or spectrally filtering in the power-off state. Also, it is important to consider the imperfections of the switch in realizing the idealized 90° and 0° rotation states. These imperfections will affect the filter response in both the white and spectrally filtering states, and it may be preferred to favor the performance of one state over the other. Based on this analysis, one switch sense or the other will generally be preferred, and the angles of the elements of the second network chosen accordingly.

Class II:

A second class of switchable filters may be formed of a first network with retarders oriented at angles $$\phi_i = \{\phi_1, \phi_2, \ldots \phi_n\},$$

followed by a second network with retarders oriented at angles $$\phi_i = \{\pi/2 - \phi_n, \pi/2 - \phi_{n-1}, \ldots \pi/2 - \phi_1\}.$$

A $\lambda/2$ plate with its fast axis oriented at 0° is placed between the first and network. This element is then switched, mechanically or optically, so that its retardance goes effectively to zero. The result is again a filter which switches between a white state and a selected color state. The color state is a harmonic function with N harmonic coefficients, determined by the angles $\phi_i$ and the retardances, as shown below. This offers wide discretion over the resulting filtration action.

The filter action is most easily understood using the Jones calculus. When the half-wave plate is present, the Jones matrix is $$E(\omega) = \begin{bmatrix} e^{-2\pi i R/\lambda} & 0 \\ 0 & 1 \end{bmatrix} = \begin{bmatrix} -1 & 0 \\ 0 & 1 \end{bmatrix} \quad (18)$$

The second network consists of the first network turned end-for-end and rotated by $\pi/2$. The end-for-end turning at once reverses the order of elements and causes the angles $+\phi_i$ to be converted to $-\phi_i$. The Jones matrix for the first network is thus given by H( ) in Equation 5, and that of the second network, prior to rotation, by H'( ) in Equation 8. The combined or overall assembly, with the half-wave plate engaged ("w/$\lambda$/2 pl."), is then described by:

$$H_{w/\lambda/2pl}(\omega) = S(\pi/2) \times H'(\omega) \times S(-\pi/2) \times E(\omega) \times H(\omega) \quad (19)$$

or $$H_{w/\lambda/2pl.} = \begin{bmatrix} 0 & -1 \\ 1 & 0 \end{bmatrix} \times \begin{bmatrix} C(\omega) & D(\omega) \\ -e^{-iNa\omega}D(-\omega) & e^{-iNa\omega}C(-\omega) \end{bmatrix} \times \quad (20)$$

$$\begin{bmatrix} 0 & 1 \\ -1 & 0 \end{bmatrix} \times \begin{bmatrix} -1 & 0 \\ 0 & 1 \end{bmatrix} \begin{bmatrix} C(\omega) & e^{-iNa\omega}D(-\omega) \\ -D(\omega) & e^{-iNa\omega}C(-\omega) \end{bmatrix}$$

$$H_{w/\lambda/2pl.} = \begin{bmatrix} e^{-iNa\omega}D(-\omega) & -e^{-iNa\omega}C(-\omega) \\ C(\omega) & D(\omega) \end{bmatrix} \times \quad (21)$$

$$\begin{bmatrix} 0 & 1 \\ 1 & 0 \end{bmatrix} \times \begin{bmatrix} C(\omega) & e^{-iNa\omega}D(-\omega) \\ -D(\omega) & e^{-iNa\omega}C(-\omega) \end{bmatrix}$$

$$H_{w/\lambda/2pl.} = \quad (22)$$

$$\begin{bmatrix} -e^{-iNa\omega}[D(\omega)D(-\omega) + C(\omega)C(-\omega)] & 0 \\ 0 & e^{-iNa\omega}[C(\omega)C(-\omega) + D(\omega)D(-\omega)] \end{bmatrix}$$

$$H_{w/\lambda/2pl.} = \quad (23)$$

$$e^{-iNa\omega} \begin{bmatrix} -C^*(\omega)C(\omega) - D^*(\omega)D(\omega) & 0 \\ 0 & C^*(\omega)C(\omega) + D^*(\omega)D(\omega) \end{bmatrix} =$$

$$e^{-iNa\omega} \begin{bmatrix} -1 & 0 \\ 0 & 1 \end{bmatrix}$$

These equations reveal that the combined filter produces no effect on light of any wavelength or polarization state, beyond a polarization-independent phase shift. When, on the other hand, the half-wave plate is absent ("no $\lambda$/2 pl."), a different result is obtained:

$$H_{no\lambda/2pl.} = S(\pi/2) \times H'(\omega) \times S(-\pi/2) \times H(\omega) \quad (24)$$

$$H_{no\lambda/2pl.} = \begin{bmatrix} e^{-iNa\omega}D(-\omega) & -e^{-iNa\omega}C(-\omega) \\ C(\omega) & D(\omega) \end{bmatrix} \times \quad (25)$$

$$\begin{bmatrix} -D(\omega) & e^{-iNa\omega}C(-\omega) \\ -C(\omega) & -e^{-iNa\omega}D(-\omega) \end{bmatrix}$$

$$H_{no\lambda/2pl.} = \quad (26)$$

$$\begin{bmatrix} e^{-iNa\omega}[C(-\omega)C(\omega) - D(\omega)D(-\omega)] & e^{-2ina\omega}2C(-\omega)D(-\omega) \\ -2C(\omega)D(\omega) & e^{-iNa\omega}[C(-\omega)C(\omega) - D(-\omega)D(\omega)] \end{bmatrix}$$

The above-described system thus forms another switchable color filter with two states defined by Equations 23 and 26, the former of which is an all-pass (white) state. For this filter, the switching action is effected by a half-wave plate which may be an achromatic $\lambda$/2 plate, such as described by Title ("Improvement of Birefringent Filters. 2: Achromatic Waveplates", 14 *Applied Optics* 229 (1975)), or a simple $\lambda$/2 waveplate. The plate may be mechanically moved into the beam to effect switching.

Figure 7:
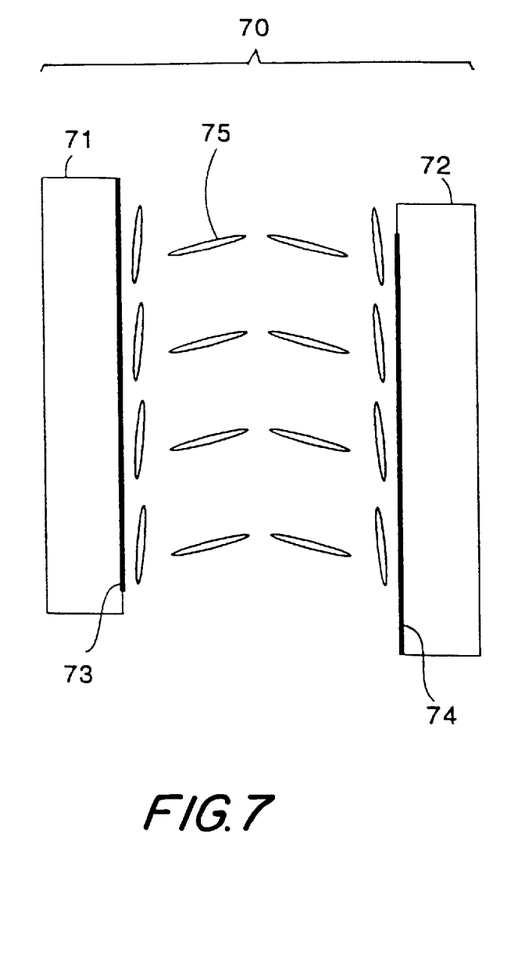
FIG. 7 is a cross-sectional side view of another liquid crystal commonly known as a "pi cell"

Alternatively, a liquid crystal variable-retarder element can be used as an electro-optic switch. By way of example, a nematic "pi-cell", as described by Bos et al. in U.S. Pat. No. 4,582,396 and illustrated in FIG. 7, is a suitable variable retarder element. In FIG. 7, the "pi-cell" is shown in a cross-sectional side view and comprises two substrates 71 and 72, electrodes 73 and 74 on the opposed inner surfaces of the substrates 71 and 72, nematic liquid crystal material 75 disposed in a symmetrical orientation between the substrates, and electrical leads for carrying a drive signal to selectively energize the switch. As illustrated, the switch is shown in the state in which it exhibits a retardance of approximately $\lambda$/2 waves.

A fixed retarder may be optionally placed in series with the "pi-cell". The fixed retarder will have a retardance equal to that of the cell in the driven state, but with its fast axis oriented orthogonal to that of the "pi-cell". This arrangement more nearly achieves zero retardance in the driven state and improves the switch action.

Figure 8:
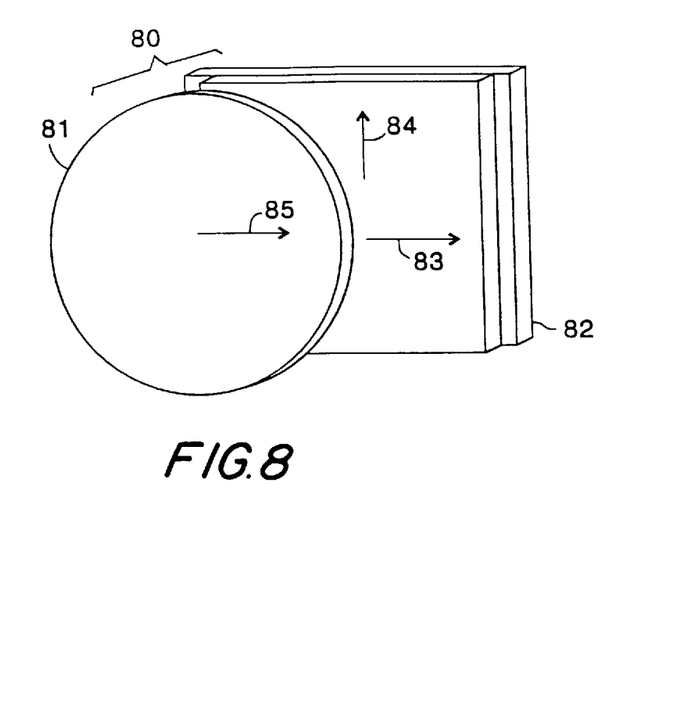
FIG. 8 illustrates a liquid crystal optical switch with an electrically switchable fast axis.

FIG. 8 shows an alternate arrangement wherein a fixed retarder is employed with a liquid crystal cell that has a fixed retardance and an electrically variable crystal orientation to function as the switch. FIG. 8 more particularly depicts an optical switch 80, formed by a fixed retarder 81 with fast axis 85 and a liquid crystal switch 82 whose fast axis is electrically switchable between orientations 83 and 84. The liquid crystal cell element has a retardance of $\lambda$/4 and a crystal axis that is switched between 0° and 90°. The fixed retarder element is a $\lambda$/4 plate with its axis at 0°. When the axes coincide, the result is a $\lambda$/2 plate at 0° and the white state is obtained. When the axes are orthogonal, there is no retardance and the filter response of Equation 26 is obtained. A non-limiting list of liquid crystal cells suitable for use in such a switch includes surface-stabilized ferro-electric liquid crystal (SSFLC) cells and electro-clinic smectic A cells.

The selection of the switch will generally depend on the particular contemplated or intended application, as well as the switching speed, cost, permissible or acceptable optical loss and other factors, and may appreciably vary in different applications within the scope of the invention. An important consideration is that the switch provide, by whatever mechanism, an effective retardance that varies between values of approximately zero and approximately $\lambda$/2.

A similar switch action is obtained when the $\lambda$/2 plate axis is located at 90° as when it is at 0° — i.e. a white state is obtained. Again, when the switch retardance is zero, the response of Equation 26 is obtained.

The selection of optical filtration action (and retarder angles) can be made in a variety of ways. As in the Class I filter described above, the optical filtration is selected to suit the immediate purpose, and the harmonic coefficients $C_i$ used in the birefringent filter synthesis are selected so as to achieve this filtration action. One approach to selecting the particulars of Class II filters is to perform a filter synthesis according to the method of Harris, Amman, and Chang for a filter of 2N elements and identify solutions having the required symmetry in retarder orientations, i.e. that the angle $\phi_{2N}$ for the last element is 90°$-\phi_1$, that $\phi_{2N-1}$ equals 90°$-\phi_2$, etc.

Another often suitable approach consists of synthesizing an N-stage network with an associated transmission function, $T_{hs}$, which is related to the $T_{des}$ (desired transmission function) by:

$$T_{hs} = 0.5 + 0.5 \times (T_{des}^{1/2})$$

A first network is synthesized to realize this function, and the angles $\phi_i$ and retardances $R_i$ are derived in the manner described by Harris, Amman, and Chang. The second network is constructed using the related angles given by the Class II symmetry relations discussed above in connection with Class II symmetry; that is, the elements in the second network are arrayed in reverse order relative to those in the first, with identical retardances and with angles $\pi/2-\phi_i$. This synthesis method is often preferable since it permits synthesis of an N-element network rather than a 2N-element network. Also, there is no need to search among the solutions for those which meet the required symmetry conditions; the required symmetry is always obtained in this way.

This approach may also be used for synthesis of Class I or Class III filters, where the first network is synthesized according to $T_{hs}$ and the second network is constructed using the related set of angles appropriate to the Class being synthesized.

Class III:

A third class of filters which operatively provide a white state and a desired response function are similarly formed of two networks in series, where the first network elements have angles $\phi$ of $$H_{type\,IIIa} = \begin{bmatrix} C(\omega) & D(\omega) \\ -e^{-iNa\omega}D(-\omega) & e^{-iNa\omega}C(-\omega) \end{bmatrix} \times \begin{bmatrix} -1 & 0 \\ 0 & 1 \end{bmatrix} + \begin{bmatrix} C(\omega) & e^{-iNa\omega}D(-\omega) \\ -D(\omega) & e^{-iNa\omega}C(-\omega) \end{bmatrix} \quad (28)$$

$$H_{type\,IIIa} = \begin{bmatrix} -C^2(\omega) - D^2(\omega) & -e^{-iNa\omega}[C(\omega)D(-\omega) - C(-\omega)D(\omega)] \\ e^{-iNa\omega}[C(\omega)D(-\omega) - C(-\omega)D(\omega)] & e^{-2iNa\omega}[D^2(-\omega) + C^2(-\omega)] \end{bmatrix} \quad (29)$$

$\phi_i = \{\phi_1, \phi_2, \ldots \phi_N\}$.

Suppose that the first network also exhibits the property that it transforms horizontally polarized light into approximately linearly polarized light of some specified orientation, which may vary with wavelength. This is equivalent to saying that: *{criterion for Class III}* for linearly polarized input light, the polarization state of light exiting the first network lies on (or near) the equator of the Poincare sphere.

The Poincare sphere representation of the polarization state of light assists in visualizing the action of such a network, and a full explanation of the sphere is available in standard optics texts such as *Ellipsometry of Polarized Light* by R. M. A. Azzam and N. M Bashara (North-Holland Press, Amsterdam, 1977).

If this criterion is met by the first network, then it may be placed in optical series with a second network having the angles {Class IIIa}

$\phi_i = \{-\phi_N, -\phi_{N-1}, \ldots -\phi_2, -\phi_1\}$ or

{Class IIIb}

$\phi_i = \{\pi/2-\phi_N, \pi/2-\phi_{N-1}, \ldots \pi/2-\phi_2, \pi/2-\phi_1\}$ or {Class IIIc}

$\phi_i = \{+\phi_N, +\phi_{N-1}, \ldots +\phi_2, +\phi_1\}$ or

{Class IIId}

$\phi_i = \{\pi/2+\phi_N, \pi/2+\phi_{N-1}, \ldots \pi/2+\phi_2, \pi/2+\phi_1\}$ to obtain a filter which can be selectively switched between all-pass (white light) and a selected color filtration action.

It is clear that Classes IIId and IIIb describe the same sets of angles as the Class I and Class II filters described above, and they are mentioned here only for completeness. Class IIIa and Class IIIc filters provide a white state when the above criterion is met, which is not true for arbitrary networks. It is not known how to predict in advance whether this will be met for a given network, nor how to choose a network in order to achieve this goal. However, it is not an uncommon result that when the synthesis method of Harris, Amman, and Chang is performed, one of the many solutions for retarder orientations will be a network which has this property to a useful degree. When this occurs, the network may be used for a Class III filter.

The switch is a waveplate with its effective axis at 0° or 90°, which is operable to alternatively provide either $\lambda/2$ or substantially zero retardance. This may be seen by considering, for example, the Jones matrix for the two networks and $\lambda/2$ plate for Class IIIa:

$$H_{type\,IIIa} = H'(\omega) \times \begin{bmatrix} -1 & 0 \\ 0 & 1 \end{bmatrix} \times H(\omega) \quad (27)$$

$H'(\omega)$ describes the second network, which is simply the first network turned end-for-end (which also reflects angles $\phi_i$ into $-\phi_i$). This is described by Equation 8, so one may solve for the overall matrix as:

This resultant matrix is not a white-state for arbitrary $C(\omega)$ and $D(\omega)$. However, when the above criterion is met, these functions obey the relationship $$D(\omega) = F(\omega) \cdot C(\omega) \quad (30)$$

where $F(\omega)$ is a real-valued function. This comes from considering Equation 5 together with the criterion that incident light linearly polarized at 0° yields linearly polarized output light. The [x, y] vector components of output light are $[C(\omega) E_{in}, -D(\omega) E_{in}]$ and these must be in-phase to be linearly polarized, which leads directly to Equation 30. Since $F(\ )$ is real, the conjugates obey $$D^*(\omega) = F(\omega) \cdot C^*(\omega) \quad (31)$$

and also $$D^*(\omega) = D(-\omega) = F(-\omega) \cdot C(-\omega) = F(-\omega) C^*(\omega) \quad (32)$$

which leads, together with equation 31, to the requirement that $F(-\omega) = F(\omega)$.

These relationships allow the off-diagonal terms in Equation 29 to be re-written as $$C(\omega)D(-\omega) - C(-\omega)D(\omega) = F(\omega) \cdot [C(\omega)C(-\omega) - C(\omega)C(-\omega)] = 0 \quad (33)$$

By conservation of energy, the diagonal terms have unit length. This can also be seen by noting that D and C are collinear, as required by Equation 30. Since they are collinear, they have the same phase angle, and $D^2$ and $C^2$ must also be collinear. Thus, $$C^2(\omega) + D^2(\omega) = \exp^{i\cdot 2\delta}[C^*(\omega)C(\omega) + D^*(\omega)D(\omega)] = \exp^{i\cdot 2\delta} \quad (34)$$

where delta "δ" is the phase angle of C(ω). Accordingly, $$H_{overall\,IIIa} = \begin{bmatrix} -e^{i2\delta} & 0 \\ 0 & e^{-i(2N a\omega + 2\delta)} \end{bmatrix} \quad (35)$$

This describes a white-state filter with a phase delay that may differ for the two eigenmodes. Accordingly, the switch action of a Class IIIa filter provides a white-state when a λ/2 wave plate is present between the networks, and a selective filter action when no waveplate is present.

The functioning of Class IIIc filters may be confirmed by the same Jones methods, and likewise yields a white-state only when the above criterion is met. The appropriate matrix for H'(ω) is given by Equation 9. For this Class, a white-state is obtained when the switch element has no retardance, and selective filter action is obtained when the switch acts as a λ/2 waveplate.

This result offers a choice of switch functions through choice of the appropriate type. In practice, considerations such as duty or use cycle, off-axis response, dispersion, switching speed, and other factors may favor a normally-white vs. a normally-selective design. Further, while the overall shape of the white-state and the spectral filtration state will be similar for a filter meeting the above criterion, there will be important differences in the detailed optical performance depending on whether the second network is constructed with angles from Class IIIa, b, c, or d. Direct calculation of the spectral filtration for all four cases, by means of the Jones calculus, will reveal these differences and provide a basis for choosing which set of angles to use.

In one preferred embodiment of the invention, the first network is formed by five equal-valued polymer retarders having angles $\phi_i = \{63, 102, 122, 87, 27\}$ degrees. The second network is constructed of identical polymer retarders having angles $\phi_i = \{63, 3, -32, -12, 27\}$ degrees. A nematic liquid crystal cell with its slow crystal axis at 0° is placed between the two networks. The polymer retarders are formed of NRP-650, from Nitto Denko America (San Jose, Calif.), laminated in the order and crystal orientation herein described. The nematic liquid crystal cell contains a 3.5 μm thick layer of ZLI-2772 liquid crystal material, and the two substrates are buffed parallel with moderate tilt angle to construct a "pi-cell" known in the art. Polarizers are placed with transmission axes at 0° at opposite ends of the assembly.

Figure 10:
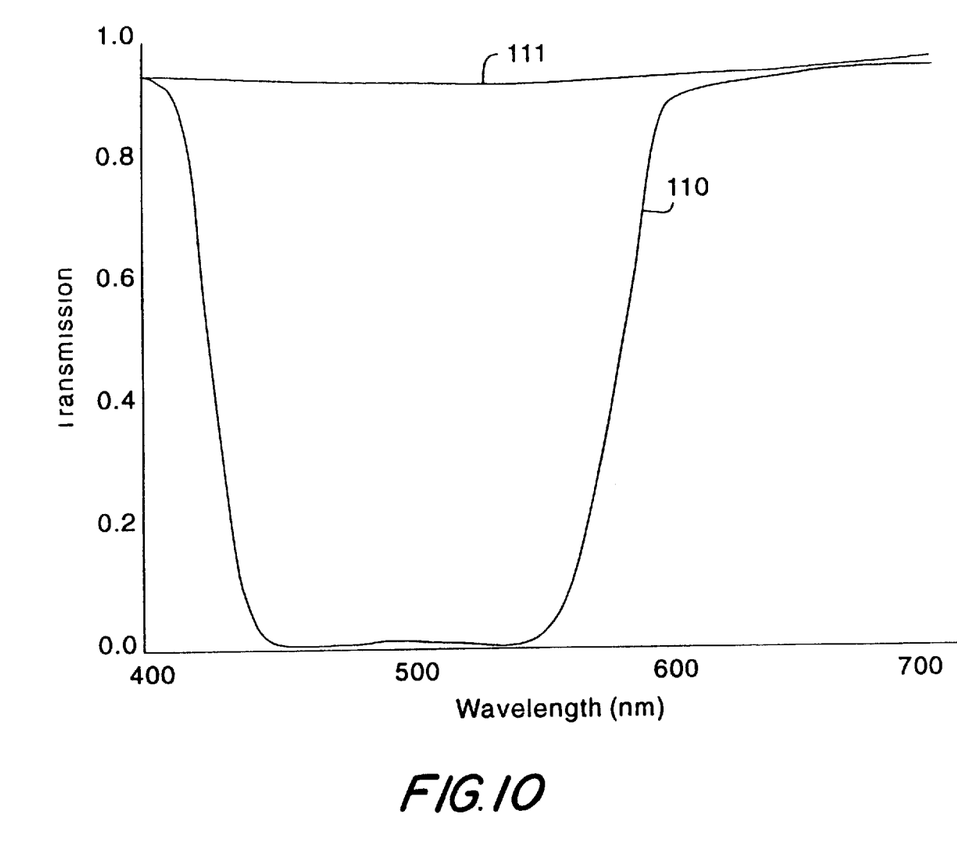
FIG. 10 depicts the transmission spectra of a color filter of the invention in the filtration and white states, respectively.

The overall filter action is shown in FIG. 10 which illustrates the transmission spectra 110 and 111 of a color filter so constructed in accordance with the present invention in the respective spectral filtration and all-pass (white) states. When a square wave of 15V AC at 2 kHz is applied to the cell, the transmission is that of the curve 110. When no voltage is applied, the curve 111 is produced. The former is a highly saturated yellow, while the latter is nearly white. The switching time from the no-voltage state to the voltage-on state is approximately 100 microseconds, and the relaxation time from the voltage-on state to the no-voltage state is about 2.5 milliseconds. Since the "pi-cell" is inherently meta-stable, the no-voltage state only survives for 40–50 milliseconds after the voltage signal is removed from the cell. This system would thus normally be suitable for use where continuous cycling between the states is expected, such as in video capture or display applications.

The second retarder is formed of the same number of optical retarders as in the first retarder network. The fast axes of the retarders of the second network are oriented at angles selected from the following group of angles: $\phi_N$ through $\phi_1$, $90°+\phi_N$ through $90°+\phi_1$, $90°-\phi_N$ through $90°-\phi_1$ and $-\phi_N$ though $-\phi_1$.

In one embodiment, the first optical retarder network is comprised of a plurality of polycarbonate optical retarders 1 to N having retardance values $R_1$ through $R_N$ and fast axes oriented at angles $\phi_1$ though $\phi_N$. A nonlimiting list of suitable retarder materials include oriented polymer sheets of polyvinyl alchohol (PVA), polycarbonate, Mylar, along with quartz, calcite, $LiNbO_3$, mica, KDP and its isomorphs, as well as films of oriented liquid crystal polymer material. In another embodiment, at least one of the retarder fast axis orientation angles $\phi$ is effectively different from the group orientation angles 0°, 45°, 90° and 135°.

In some embodiments of the invention, the switch is a mechanical device which physically rotates the second retardance network relative to the first retardance network about an axis which is substantially defined by the normal incidence of light to the filter. Alternatively, the switch may be an optical polarization rotator that selectively rotates, from a first to a second orientation, the polarization of light to obtain the intended switching action. In another embodiment, a mechanical device capable of producing linear or rotary motion is used to select whether the optical polarization rotator is engaged in the beam and rotates, or does not rotate, the polarization of light at any given time.

As discussed above, the polarization rotator may be implemented as one or more liquid crystal cells and, optionally, may contain one or more fixed retarder elements. The liquid crystal cell may be one or more of a twisted nematic cell, a nematic variable-retardance cell, a surface-stabilized ferro-electric cell, a smectic electroclinic cell, and an anti-ferroelectric cell.

Optionally, the switch is an optical wave plate that selectively produces a retardance of λ/2 to provide the intended switch action. In this embodiment, one optionally may use a mechanical device capable of producing linear or rotary motion to select between two states: a first state where the λ/2 waveplate is engaged in the beam and a second state where it is not. When engaged, the wave plate may have either its fast axis or its slow axis oriented at an angle of substantially 0° relative to the polarization axis of the polarized light incident upon the filter.

The optical wave plate can be in the form of one or more liquid crystal cells, optionally with at least one fixed retarder element, to provide electro-optical switching. The liquid crystal cell may be at least one of a nematic variable-retardance cell, a surface-stabilized ferro-electric cell, a smectic electroclinic cell, and an anti-ferroelectric cell.

In yet another embodiment, the optical filter is formed with a polarizer element responsive to the light emerging from the second retarder network.

As the present invention is generally applicable to birefringent optical filter systems, there will be additional variations and implementations that will depend on the particular optical system being constructed. These may include modifications as to thickness, retardance, harmonic coefficient values and material types which have not been specifically described but which are consistent with the invention as disclosed, and where such substitution would be apparent to one of ordinary skill in the art.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A switchable optical birefringent filter responsive to incident light, in a polarization state, passing through the filter, comprising:
    a first optical retarder network having an optical axis and a first action on the polarization state of incident light passing through the first network;
    a second optical retarder network disposed in optical series with said first retarder network for receiving light that has passed through the first network and having an optical axis and a second action on the polarization state of the received light passing through the second network;
    a switch operable for varying the filter response to the incident light passing through the first and second networks between a first operating state in which the filter transmits without significant alteration to the polarization state substantially all of the incident light within a predetermined range of wavelengths and a second operating state in which the filter produces a predetermined spectral variation of the incident light in its passing through the filter by changing one of an angular orientation of the polarization state of the received light relative to an angular orientation of the second network and the polarization state of the light received by the second network, as between said first operating state and said second operating state.

2. The optical filter of claim 1, wherein said switch comprises a mechanical switch connected to said second network for mechanically rotating said second network relative to said first network about said second network optical axis between a first and a second angle of rotation.

3. The optical filter of claim 1, wherein said switch comprises an optical switch disposed between said first and second networks and operable for rotating the orientation of the polarization state of the incident light passing between said first and second networks between said first and second angles of rotation.

4. The optical filter of claim 1, wherein the first optical retarder network comprises a plurality of optical retarders 1 to N having retardance values $R_1$ through $R_N$ and fast axes oriented at angles $\phi_1$ through $\phi_N$.

5. The optical filter of claim 4, wherein at least one of the said retarder fast axis orientation angles is effectively different from a group of orientation angles consisting of 0°, 45°, 90°, and 135°.

6. The optical filter of claim 4, wherein the said second retarder network comprises a plurality of optical retarders corresponding in number to said plurality of optical retarders of said first retarder network.

7. The optical filter of claim 6, wherein the fast axes of the retarders of said second retarder network are oriented at angles selected from one of $\phi_N$ through $\phi_1$, 90°+$\phi_N$ through 90°+$\phi_1$, 90°−$\phi_N$ through 90°−$\phi_1$, and −$\phi_N$ through −$\phi_1$.

8. The optical filter of claim 6, wherein said switch comprises a mechanical switch for rotating the second retardance network relative to the first retardance network about a filter axis defined by the optical axes of the first and second retarder networks.

9. The optical filter of claim 6, wherein said switch comprises an optical polarization rotator that selectively rotates the polarization state of said received light to provide a switching action.

10. The optical filter of claim 9, wherein said polarization rotator comprises at least one liquid crystal cell.

11. The optical filter of claim 10, wherein said polarization rotator further comprises one or more fixed retarder elements.

12. The optical filter of claim 10, wherein said at least one, liquid crystal cell is selected from a group consisting of a twisted nematic cell, a nematic variable-retardance cell, a surface-stabilized ferro-electric cell, a smectic electroclinic cell, and an anti-ferroelectric cell.

13. The optical filter of claim 6, wherein said switch comprises an optical wave plate operable to selectively produce a retardance of $\lambda/2$ to provide a switching action.

14. The optical filter of claim 13, wherein said optical wave plate comprises at least one liquid crystal cell.

15. The optical filter of claim 14, wherein said optical wave plate further comprises at least one fixed retarder element.

16. The optical filter of claim 14, wherein said least one liquid crystal cell is selected from the group consisting of a nematic variable-retardance cell, a surface-stabilized ferro-electric cell, a smectic electroclinic cell, and an anti-ferroelectric cell.

17. The optical filter of claim 13, wherein said wave plate has one of its fast axis and its slow axis oriented at an angle of substantially 0° relative to a polarization axis of said incident polarized light.

18. The optical filter of claim 4, further comprising polarizing means responsive to incident light emerging from said second retarder network.

19. A switchable optical birefringent filter responsive to incident light, in a polarization state, passing through the filter, comprising:
    a first optical retarder network having an optical axis and a first action on the polarization state of incident light passing through the first network;
    a second optical retarder network disposed in optical series with said first retarder network for receiving light that has passed through the first network and having an optical axis and a second action on the polarization state of the received light passing through the second network;
    a switch operable for varying the filter response to the incident light passing through the first and second networks between a first operating state in which the filter transmits without significant alteration to the polarization state substantially all of the incident light within a predetermined range of wavelengths and a second operating state in which the filter produces a predetermined spectral variation of the incident light in its passing through the filter by changing an angular orientation of the polarization state of the received light relative to an angular orientation of the second network, as between said first operating state and said second operating state.

20. A switchable optical birefringent filter responsive to incident light, in a polarization state, passing through the filter, comprising:
    a first optical retarder network having an optical axis and a first action on the polarization state of incident light passing through the first network;
    a second optical retarder network disposed in optical series with said first retarder network for receiving light that has passed through the first network and having an optical axis and a second action on the polarization state of the received light passing through the second network;

a switch operable for varying the filter response to the incident light passing through the first and second networks between a first operating state in which the filter transmits without significant alteration to the polarization state substantially all of the incident light within a predetermined range of wavelengths and a second operating state in which the filter produces a predetermined spectral variation of the incident light in its passing through the filter by changing the polarization state of the light received by the second network, as between said first operating state and said second operating state.

* * * * *